No. 772,411. PATENTED OCT. 18, 1904.
I. R. FOX.
CAMPAIGN HORN.
APPLICATION FILED APR. 12, 1904.
NO MODEL.
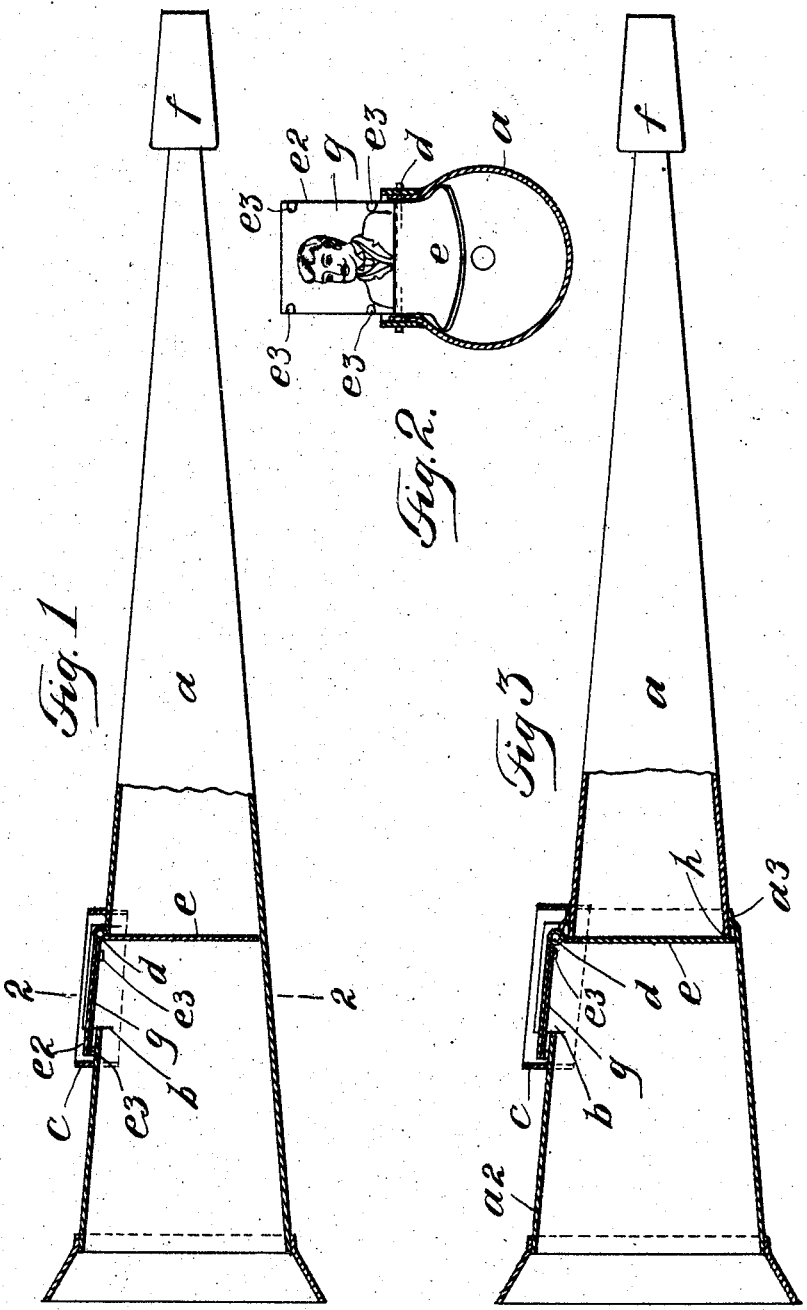
WITNESSES
INVENTOR
Ira R. Fox
BY Edgar Tate & Co
ATTORNEYS No. 772,411.

Patented October 18, 1904.

UNITED STATES PATENT OFFICE.

IRA R. FOX, OF BROOKLYN, NEW YORK.

CAMPAIGN-HORN.

SPECIFICATION forming part of Letters Patent No. 772,411, dated October 18, 1904.

Application filed April 12, 1904. Serial No. 202,794. (No model.)

*To all whom it may concern:*

Be it known that I, IRA R. FOX, a citizen of the United States, residing at Brooklyn, in the county of Kings and State of New York, have invented certain new and useful Improvements in Campaign-Horns, of which the following is a specification, such as will enable those skilled in the art to which it appertains to make and use the same.

The object of this invention is to provide a campaign-horn which is so constructed that when the horn is blown the picture of a candidate will be thrown into view; and with this object in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a sectional side view of a campaign-horn made according to my invention; Fig. 2, a section on the line 2 2 of Fig. 1, but showing the picture of the candidate exposed; and Fig. 3, a view similar to Fig. 1, showing a modification.

In the practice of my invention as shown in Figs. 1 and 2 I provide an ordinary campaign-horn $a$, the top of which is provided, near the larger end thereof, with an opening $b$, around which is preferably placed a rim $c$.

At the rear edge of the opening $b$ is a transverse pivot-pin $d$, having suitable end bearings and secured to which is a depending wind-plate $e$, which forms a transverse partition in the horn $a$ and which is provided with a flap or fly member $e^2$, which normally rests on the top portion of the horn over the opening $b$ and forming a cover therefor. The wind-plate $e$ and the flap or fly member $e^2$ thereof may be formed integrally and be coiled around the transverse pivot-pin $d$ and be secured thereto, or they may be formed separately and be secured to said pin in any desired manner.

The horn $a$ is provided with the usual mouthpiece $f$, and in practice the picture of a candidate is secured to the bottom of the flap or fly member $e^2$, as shown at $g$, and when the horn is blown in the usual manner the wind-plate $e$ will be forced forwardly and upwardly and the flap or fly member $e^2$ will be raised into a vertical position, as shown in Fig. 2, so as to expose or exhibit the picture of the candidate.

In the form of construction shown the flap or fly member $e^2$ is provided at its opposite sides or near its opposite corners with clips $e^3$, which hold the picture $g$ in place; but said flap or fly member may be of any preferred form or construction which will serve to hold the picture, and the picture may be connected therewith in any desired manner.

In the construction shown in Fig. 3 the horn $a$ is composed of two parts, the larger end portion $a^2$ thereof being formed separately and being larger than the main part thereof and being secured thereto, as shown at $a^3$, and in this form of construction the wind-plate $e$ abuts against the end of the main part of the horn, as shown at $h$, and with this construction the air passing through the horn will operate with greater force on said wind-plate, as the end of the main part of the horn at $h$ is entirely closed by said wind-plate, and with this form of construction the picture $g$ will also be thrown into view or exposed by blowing through the horn $a$ the same as with the construction shown in Fig. 1.

My invention is not limited to the exact construction herein shown and described, as it will be apparent that various changes therein and modifications thereof may be made without departing from the spirit of my invention or sacrificing its advantages, the chief object of the invention being to provide a campaign-horn with which is connected or may be connected the picture of a candidate which will be thrown into view or exposed by the operation of blowing on the horn and which will be normally held out of sight when the horn is not in use.

The horn $a$ may be used for purposes other than those herein specified, and another form of exhibit or device may be employed in connection therewith in such a manner that the said exhibit or device would be thrown into view only when the horn was in use.

Having fully described my invention, what

I claim as new, and desire to secure by Letters Patent, is—

A campaign-horn, provided in one side thereof and near the larger end thereof with an opening around which is a flange or rim, a picture-holder pivoted rearwardly of said opening within said flange or rim, and a wind-plate secured to the pivoted end of the picture-holder and ranging transversely of the passage through the horn whereby the picture will be thrown into view in the operation of blowing the horn, substantially as shown and described.

In testimony that I claim the foregoing as my invention I have signed my name, in presence of the subscribing witnesses, this 9th day of April, 1904.

IRA R. FOX.

Witnesses:
F. A. STEWART,
C. E. MULREANY.